(12) United States Patent
Hecht et al.

(10) Patent No.: US 7,079,667 B2
(45) Date of Patent: Jul. 18, 2006

(54) METHOD AND APPARATUS FOR IMPLEMENTING OCCLUSION GLYPH CODE TILINGS

(75) Inventors: David L. Hecht, Palo Alto, CA (US); Glen W. Petrie, Los Gatos, CA (US); L. Noah Flores, Woodside, CA (US); Matt Gorbet, San Francisco, CA (US)

(73) Assignee: Xerox Corporation, Stamford, CT (US)

(*) Notice: Subject to any disclaimer, the term of this patent is extended or adjusted under 35 U.S.C. 154(b) by 748 days.

(21) Appl. No.: 09/739,297

(22) Filed: Dec. 19, 2000

(65) Prior Publication Data
US 2002/0076080 A1    Jun. 20, 2002

(51) Int. Cl.
*G06K 9/00* (2006.01)

(52) U.S. Cl. ............. 382/100; 382/112; 235/494; 283/73

(58) Field of Classification Search ........... 382/100, 382/112; 235/494; 283/73, 83
See application file for complete search history.

(56) References Cited

U.S. PATENT DOCUMENTS

| | | | | |
|---|---|---|---|---|
| 5,611,575 A * | 3/1997 | Petrie | | 283/67 |
| 5,771,245 A * | 6/1998 | Zhang | | 714/762 |
| 5,861,891 A * | 1/1999 | Becker | | 345/619 |
| 5,883,627 A | 3/1999 | Pleyer | | 345/348 |
| 5,939,703 A | 8/1999 | Hecht et al. | | 235/494 |
| 5,951,055 A * | 9/1999 | Mowry, Jr. | | 283/93 |
| 6,000,621 A * | 12/1999 | Hecht et al. | | 235/494 |
| 6,108,014 A * | 8/2000 | Dye | | 345/544 |
| 6,215,503 B1 * | 4/2001 | Snyder et al. | | 345/629 |
| 6,256,398 B1 * | 7/2001 | Chang | | 382/100 |
| 6,457,651 B1 * | 10/2002 | Paul et al. | | 235/494 |
| 6,574,360 B1 * | 6/2003 | Berdardini et al. | | 382/154 |
| 6,583,789 B1 * | 6/2003 | Carlson et al. | | 345/471 |

FOREIGN PATENT DOCUMENTS

| | | |
|---|---|---|
| EP | 0 984 390 | 3/2000 |
| EP | 1 215 617 | 6/2002 |
| WO | WO 00/73981 A1 | 12/2000 |
| WO | WO 01/01670 A1 | 1/2001 |

OTHER PUBLICATIONS

European Search Report for application No. EP 01 13 0197 (U.S. Appl. No. 09/739,297), Apr. 2, 2003.

* cited by examiner

*Primary Examiner*—Jingge Wu
*Assistant Examiner*—Charles Kim
(74) *Attorney, Agent, or Firm*—Fay, Sharpe, Fagan, Minnich & McKee, LLP

(57) ABSTRACT

An embedded data code comprises periodic tiles having occlusions. In one embodiment, each tile is comprised of glyphs encoding a first code system. The occlusions are comprised of information, such as glyphs encoding a second code system, graphics, or text. The occlusions may occur periodically in each tile. A reading device may be used to capture an image of a portion of the substrate that includes a tile. A processor then analyzes the image to determine the tile code pattern and decode the tiled code.

12 Claims, 14 Drawing Sheets

METHOD AND APPARATUS FOR IMPLEMENTING OCCLUSION GLYPH CODE TILINGS

CROSS-REFERENCE TO RELATED APPLICATIONS

This application is related to U.S. application Ser. No. 09/737,869 entitled METHOD AND APPARATUS FOR IMPLEMENTING A USER INTERFACE USING OCCLUSION GLYPH CODE TILINGS filed Dec. 18, 2000, now abandoned.

BACKGROUND OF THE INVENTION

The present invention relates to glyph codes, and in particular to glyph codes having occluded regions.

Codes can be embedded in an image on a substrate using machine-readable marks, such as glyph marks used in Xerox DATAGLYPH codes. The machine-readable marks can be captured in an image, and the image analyzed to extract information from the codes embedded in the image. Glyph marks in particular have several advantages. For example, glyph codes can be decoded from glyph marks even when the image carrying the glyph marks is distorted or there is some type of noise in the glyph marks.

Another advantage of glyph marks is that they may have an unobtrusive visual appearance. If the glyph marks are sufficiently small, the glyphs appear as grayscale to the unaided eye. For example, logically-ordered, single-bit digital quanta may be encoded by respective elongated slash-like glyphs tilted to the left and right of vertical by approximately +45° and −45° for encoding logical "0s" and "1s," respectively. The mutual orthogonality of the glyphs for the two logical states of 0 and 1 of these single bit digital quanta enhances the discriminability of the code. Thus, the code pattern embedded in the glyphs can be recovered from an image of the glyphs, even when the code pattern is written on a fine grain pattern to cause the code pattern to have a generally uniform grayscale appearance.

Decoding machine-readable marks, such as glyphs, in a substrate image requires an image capture window sized large enough to capture a sufficiently large set of glyphs from which the code pattern embedded therein can be decoded. If the capture area is too small, there will not be a sufficiently large set of glyph codes from which the embedded code pattern can be decoded. Therefore, the required size and shape of the image capture window will vary depending on the particular code pattern embedded in the glyphs and the characteristics of the glyphs, such as size, shape, and orientation. For periodic tiled glyph patterns, an image capture window encompassing a tile provides an image area of glyphs that can be used for glyph decoding. If the capture window is shifted from alignment with a tile in a periodic tiled code pattern, the tile can still be reconstructed from the captured parts. See, for example, U.S. Pat. No. 6,000,621 to Hecht, et al., entitled Tilings of Mono-Code and Dual-Code Embedded Data Pattern Strips For Robust Asynchronous Capture, which teaches facilitating recovery of data through use of an appropriately-sized capture window, and is hereby expressly incorporated by reference. Once a complete tile has been captured, it can be decoded and the retrieved information used to perform a function.

Unfortunately, prior art tiled code systems are somewhat limited in their use as graphical printing occlusions may obscure parts of a tile needed for decoding. What is needed is a code system that enables use with graphical occlusions. It is also desirable that the code system accommodate additional code elements such as address codes to provide more information in addition to that found in prior art tiled code systems.

It is sometimes additionally desirable to occlude areas of the substrate with graphical markings that may interfere with data glyph reading. For example, in a system implementing a graphical user interface on a substrate, graphics, such as icons, may occlude glyphs on the substrate. The user places an image capture device over an area of the substrate to select an icon. The image captured by the image capture device typically includes regions where glyph codes are occluded. Conventional codes may not provide robust decoding because they are not designed to compensate for the occlusions.

What is needed is a code system that allows for occluded areas of glyphs and still provides a robust decoding of the underlying glyphs captured by an image capture device having a limited window capture size.

SUMMARY OF THE INVENTION

Apparatus, methods, and articles of manufacture consistent with the present invention provide a tiled code system for embedded data on a substrate. The tiled code system is embedded in machine-readable marks and facilitates robust decoding of machine-readable marks, such as glyphs, when areas on the substrate are occluded.

Additional objects and advantages of the invention will be set forth in part in the description which follows, and in part will be clear from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and, together with the description, serve to explain the principles of the invention.

FIG. 13 illustrates an address carpet code;

FIG. 14 shows the address carpet code of FIG. 13, filling the occlusion regions of tiled code of columns of glyphs indicated in bold;

DETAILED DESCRIPTION OF THE INVENTION

Reference will now be made in detail to embodiments of the invention, examples of which are illustrated in the accompanying drawings. Methods, apparatus, and articles of manufacture disclosed herein consistent with the principles of the invention implement a code pattern tiled for a window capture having multiple occlusions of the glyph pattern in which the code pattern is embedded.

Figure 1:
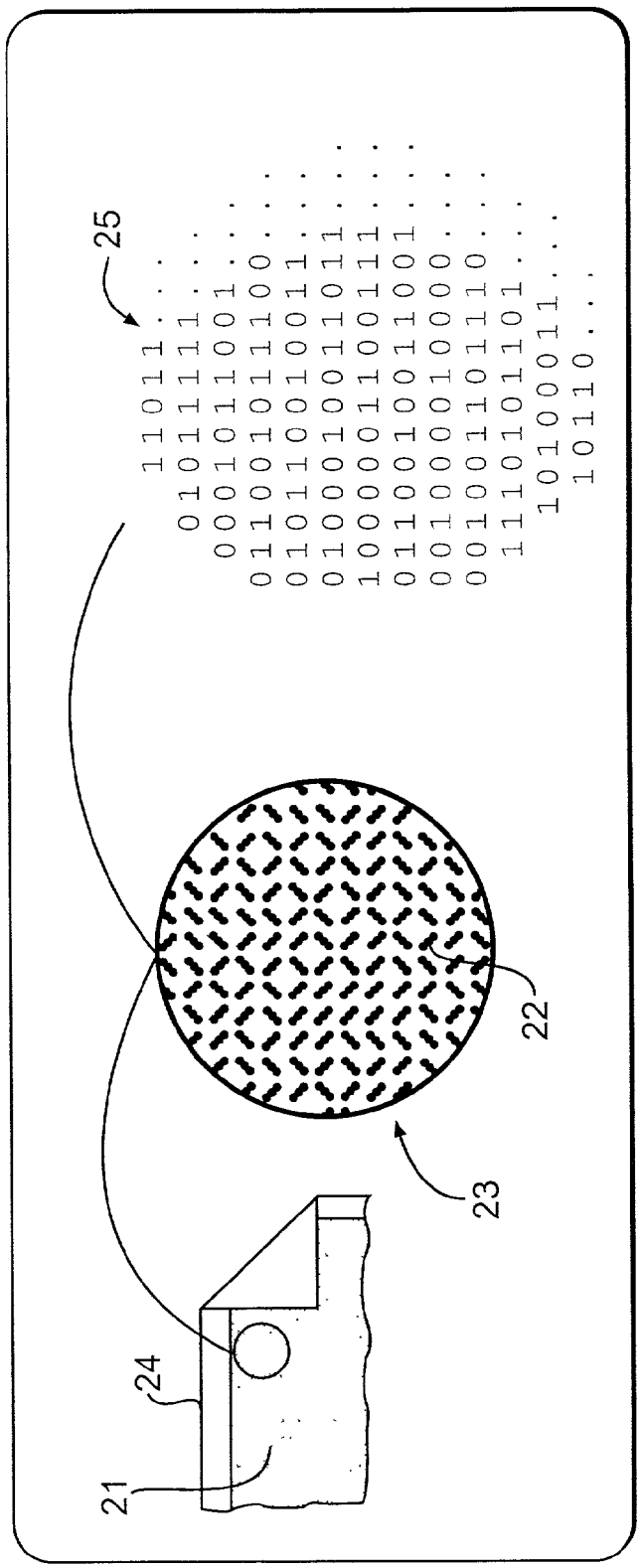
FIG. 1 illustrates an overview of the properties of a glyph code pattern.

FIG. 1 illustrates properties of glyph marks and codes embedded in the glyph marks. Glyph marks are typically implemented as a pattern on a substrate, such as glyph marks 21 on substrate 24. Glyph marks 21 are not easily resolved by the unaided human eye. Thus, glyph marks 21 appear to the unaided eye to have a uniform gray scale appearance or texture.

Enlarged area 23 shows an area of glyph marks 21. Glyph marks 21 are typically comprised of elongated slash-like marks, such as glyph 22, and are typically distributed evenly widthwise and lengthwise on a lattice of glyph center points to form a rectangular pattern of glyphs. In one embodiment, glyphs are tilted backward or forward, representing the binary values of "0" or "1," respectively. For example, glyphs may be tilted at +45° or −45° with respect to the longitudinal dimension of substrate 24. Using these binary properties, the glyph marks can be used to create a pattern of glyph marks representing 1's and 1's embodying a particular coding system.

The glyph marks of enlarged area 23 can be read by an image capture device and decoded into 0's and 1's by a decoding device. Decoding the glyphs into 0's and 1's creates a glyph code pattern 25. The 0's and 1's of glyph code pattern 25 can be further decoded in accordance with the particular coding system used to create glyph pattern 21. Additional processing might be necessary to resolve ambiguities created by distorted or erased glyphs. In one embodiment, glyph code pattern 21 comprises tiles of glyph marks. A tile is a shaped area, such as a rectangle, which can be repeated to cover the substrate without overlap. Consistent with the principles of the present invention, a tile is required to be used as the basis for a periodic tiling. This is analogous to the tiling of a wall with rectangular bricks. See, for example, U.S. Pat. No. 6,000,621 to Hecht, et al., entitled Tilings of Mono-Code and Dual-Code Embedded Data Pattern Strips For Robust Asynchronous Capture, which teaches tiled codes, and is hereby expressly incorporated by reference. Tile shapes other than rectangular may also be used.

In one embodiment, each tile comprises an identical pattern of glyph marks encoding identical information. For example, the tile information encoded by the glyph marks in each tile might comprise a label identifying the substrate, in addition to other information about the substrate, tiles, or glyph marks on the substrate. Thus, information can be derived by decoding the tiles. For example, in one embodiment the decoded information defines characteristics of the underlying substrate and the glyph marks on the substrate.

Additionally, the codes in the tiles of glyph marks have particular properties that allow predetermined occlusions of the tiles without compromising decodability of the information encoded in a tile of glyph marks. An occlusion is an area of a tile that does not necessarily have the same coding scheme as the remainder of the tile. For example, an area of a tile might be obliterated by an icon graphic printed over glyph marks of the tile or some glyph lattice positions may be written with glyphs of another coding system, which may not necessarily be identical from tile to tile.

Each tile may have one or more predefined occlusion shapes in predefined respective locations in the tile. For example, the occlusions may be laid out with tiling vectors that are an integer fraction, such as one-half or one-third of the repeating contiguous tiles of glyph marks in one or two directions.

The occlusions may also have variable images within congruent occlusion tile shapes. For example, the occlusions may have different marks and colors. The occlusions may additionally comprise different visual indicia, such as graphics, text, glyphs, or a combination of different types of visual indicia. An occlusion that includes glyphs could be decoded to provide information. For example, the decoded information may provide information relevant to the particular occlusion image such as identification or type.

Figure 2:
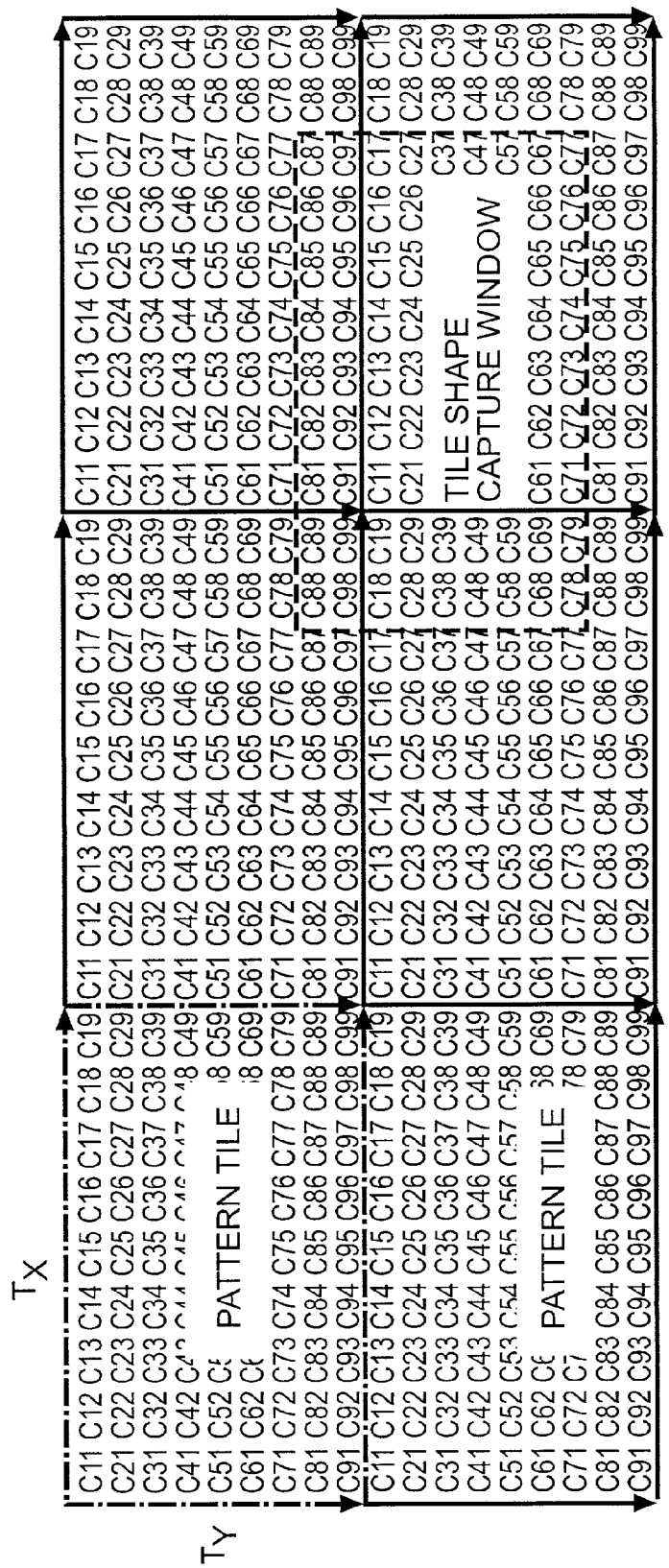
FIG. 2 illustrates a glyph code pattern having repeating rectangular glyph tiles.

FIG. 2 illustrates a glyph code pattern having repeating rectangular glyph tiles. Tiling vectors $T_x$ and $T_y$ define a rectangular glyph tile comprised of glyph codes C11 to C99. The glyph tile regularly repeats in the horizontal and vertical directions to form a tiling which is periodic in each direction. Glyph codes C11 to C99 of each tile comprise a glyph code pattern representing information, such as a label identifying the substrate on which the glyph tiles appear.

FIG. 2 also illustrates a tile-shaped capture window, denoted by a broken line surrounding a rectangular area of the glyph code defined by corners C88, C87, C78 and C77. Capturing an image of an area encompassing at least the shape and size of a tile will include an instance of each common glyph mark of the tile. Because the captured image includes each common glyph mark of a tile, the tiled code can be reconstructed from the captured image. See, for example, U.S. Pat. No. 6,000,621 to Hecht, et al., entitled Tilings of Mono-Code and Dual-Code Embedded Data Pattern Strips For Robust Asynchronous Capture, which teaches facilitating recovery of data through use of an appropriately-sized capture window, and is hereby expressly incorporated by reference.

Figure 3:
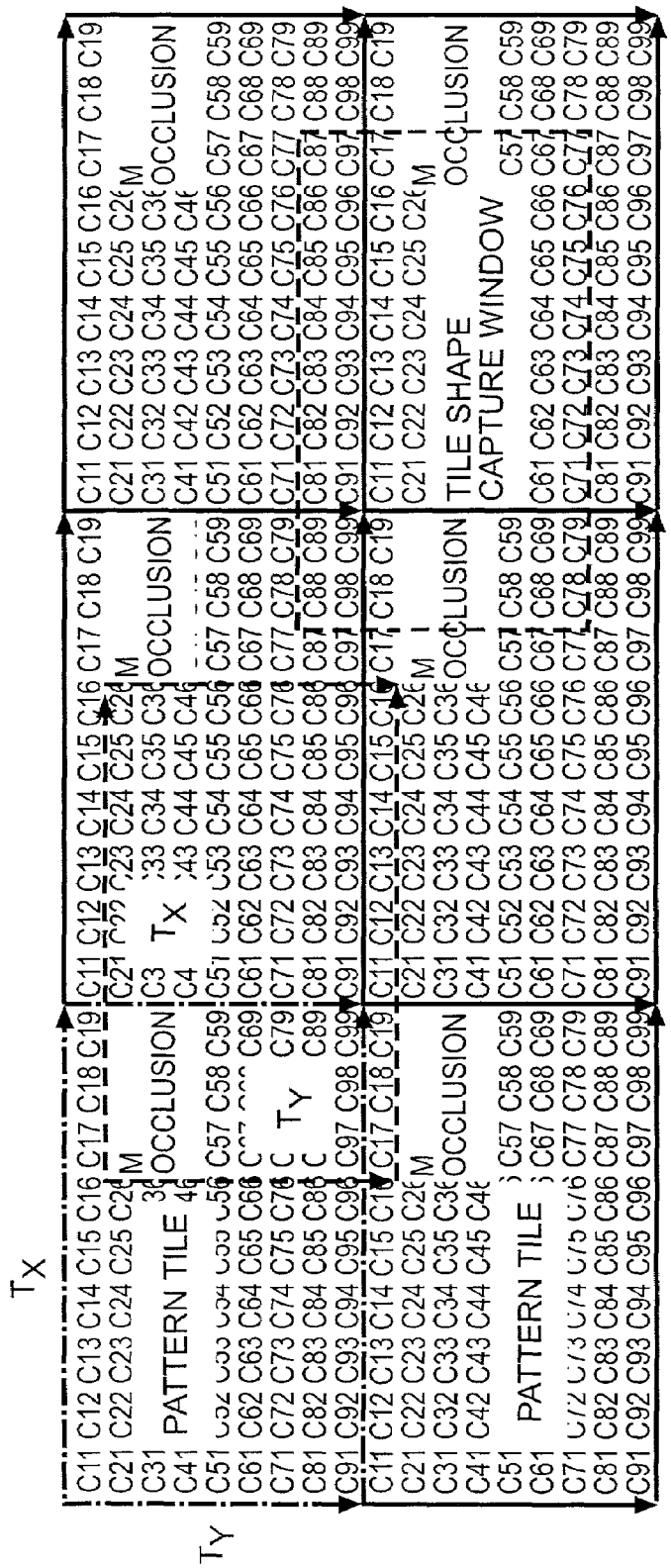
FIG. 3 illustrates a glyph code pattern having repeating rectangular glyph tiles with periodic fixed marked occlusions.

FIG. 3 illustrates a glyph code pattern having repeating rectangular glyph tiles with periodic fixed marking occlusions. The occlusions are periodic in that they appear with regular frequency across the array of tiles. In FIG. 3, each tile has an occlusion ("M occlusion") covering a particular region within the tile. As shown in FIG. 3, each occlusion covers code positions C27, C28, C29, C37, C38, C39, C47, C48, and C49 in each tile.

Figure 4:
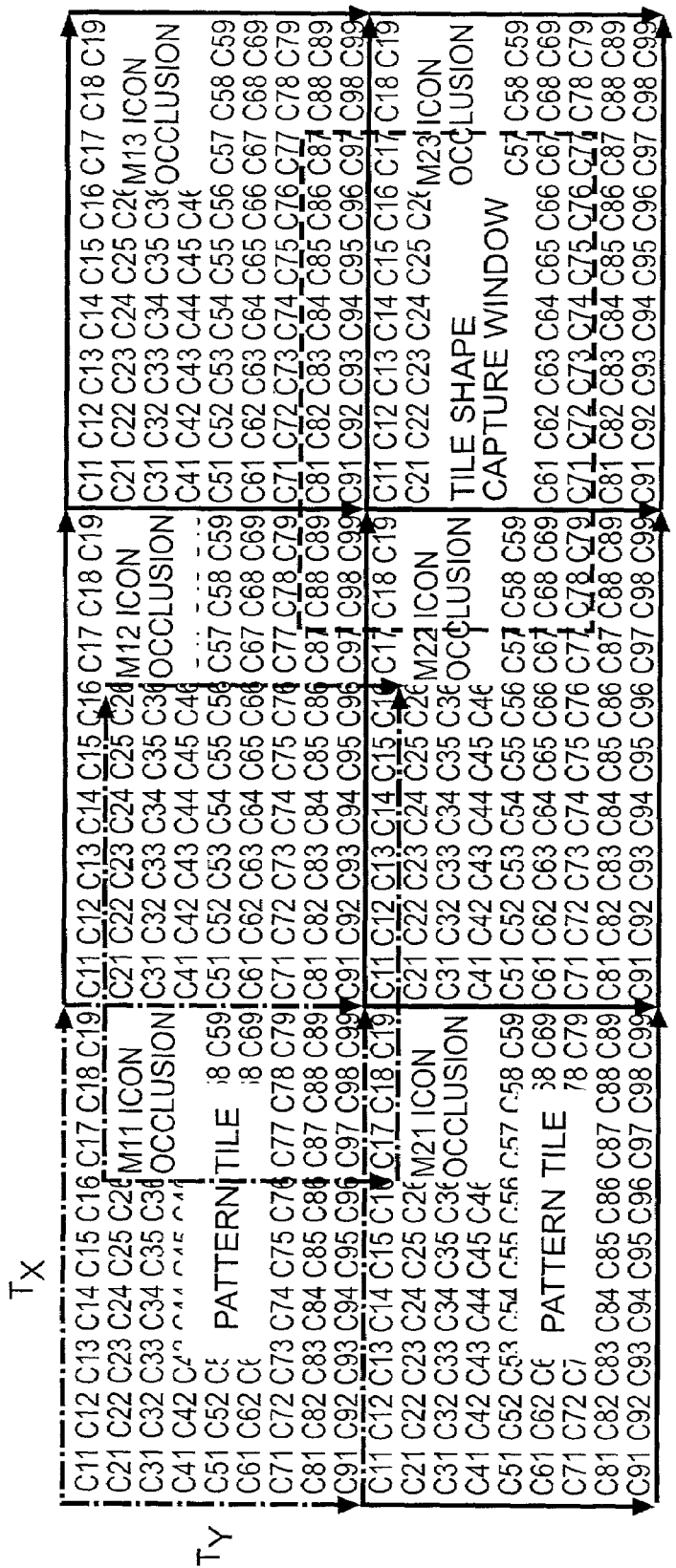
FIG. 4 illustrates a glyph code pattern having repeating rectangular glyph tiles with periodic variable marked occlusions.

FIG. 4 illustrates a glyph code pattern having repeating rectangular glyph tiles with periodic variably-marked occlusions. As in FIG. 3, the occlusions are periodic in that they appear with regular frequency across the array of tiles. In the embodiment of FIG. 4, however, the occlusion in each tile ("Mxx occlusion") may have a unique marking. For example, as shown in FIG. 4, each occlusion may be a unique graphic icon. Using icons is particularly useful in implementing a graphical user interface.

Figure 5:
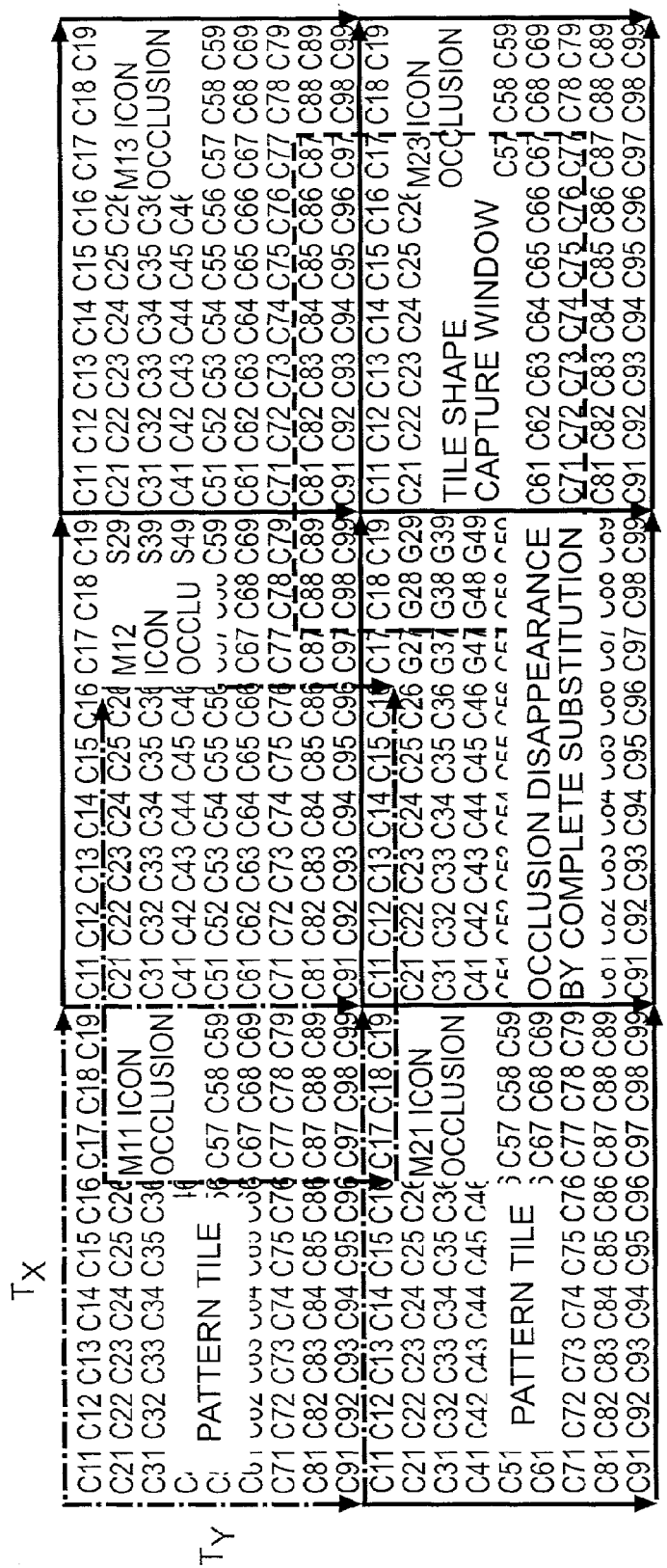
FIG. 5 illustrates a glyph code pattern having repeating rectangular glyph tiles with periodic occlusions with variable marking including overlay glyph codes.

FIG. 5 illustrates a glyph code pattern having repeating rectangular glyph tiles with periodic occlusions that include glyph codes. FIG. 5 is similar to FIG. 4 in that each tile has an occlusion covering particular glyph lattice positions within the tile. Each occlusion marking ("Mxx occlusion") may be unique. In FIG. 5, however, the occlusions include glyphs that change the visually apparent shape of the occlusion. These glyphs may be decodable to provide a code, such as a code identifying a particular occlusion. Occlusion glyphs may also be merely decorative. For example, occlusion M12 in the upper middle tile includes glyph codes S29, S39, and S49, and occlusion M22 (not labeled in FIG. 5) in the lower middle tile includes glyph codes G27, G28, G29, G37, G38, G39, G47, G48, and G49. Thus, occlusions M12 and M22 include glyph codes on the same lattice as the tiled glyph codes, but have a code system S and G that may be different than tiled code system C. In another example, the glyph codes in the occlusion area comprise address codes spanning multiple tiles and may be used to aid in reconstruction of the tiles from a captured image.

Figure 6:
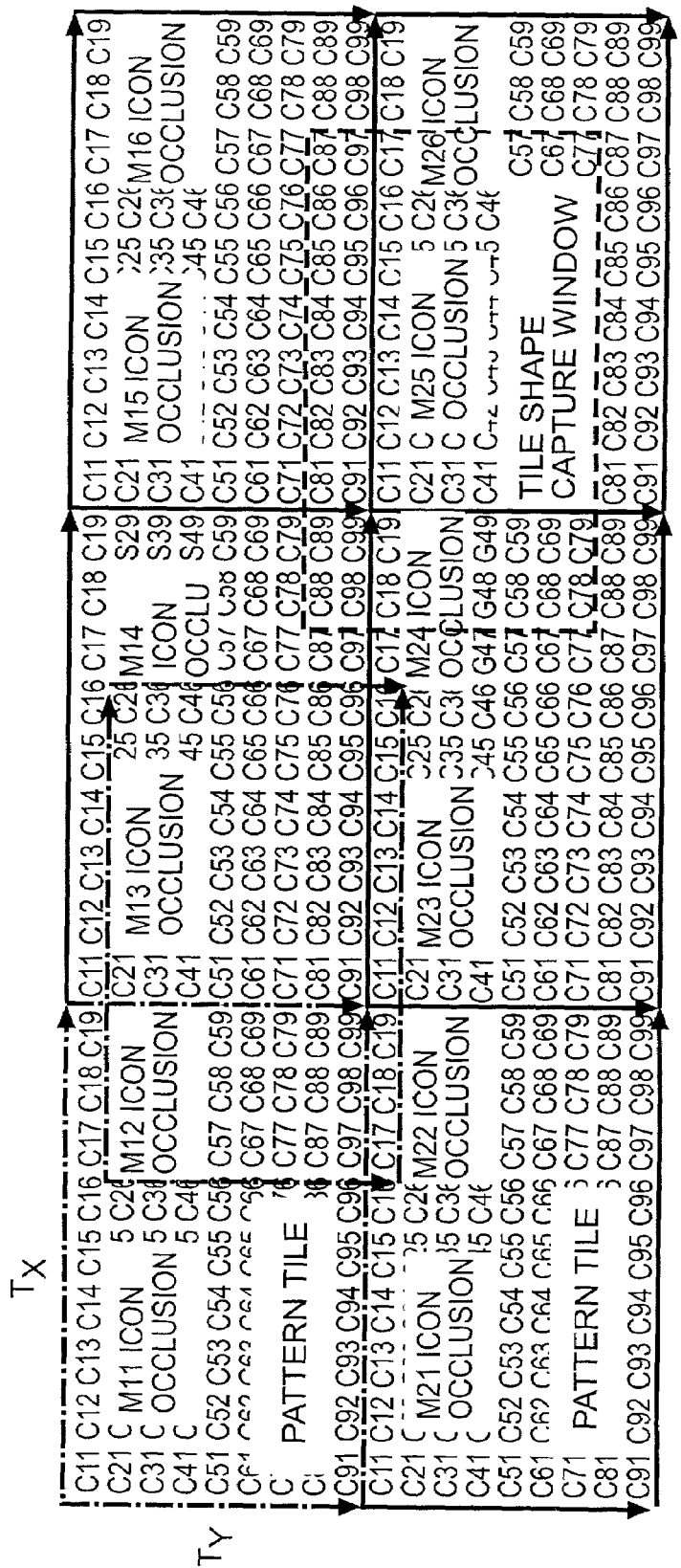
FIG. 6 illustrates a glyph code pattern having repeating rectangular glyph tiles with occlusions subperiodic in the X direction.

FIG. 6 illustrates a glyph code pattern having repeating rectangular glyph tiles with subperiodic occlusions in the X direction. Each tile includes two occlusions, thus creating subperiodic occlusions in the X direction. These occlusions may include glyphs, as illustrated by occlusion M14 and occlusion M24.

Figure 7:
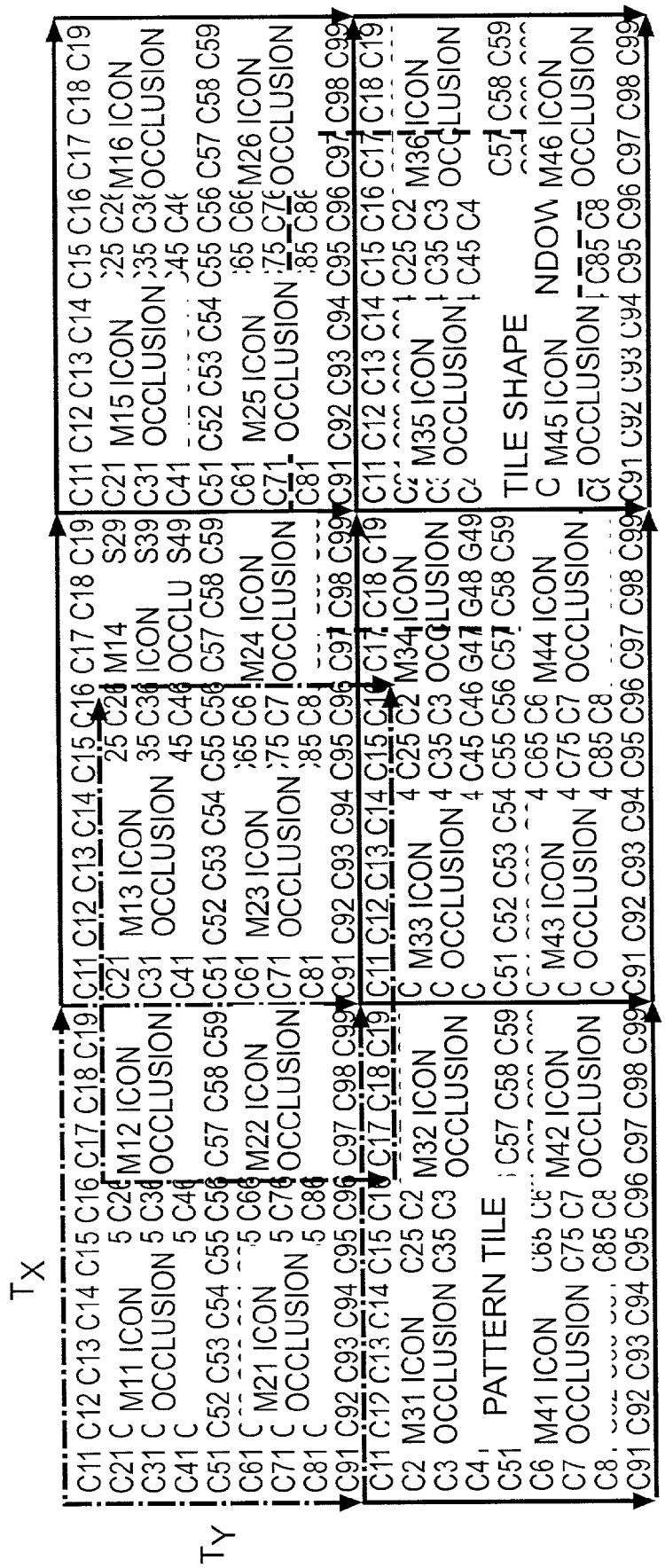
FIG. 7 illustrates a glyph code pattern having repeating rectangular glyph tiles with occlusions subperiodic in the X and Y direction.

FIG. 7 illustrates a glyph code pattern having repeating rectangular glyph tiles with subperiodic occlusions in the X and Y direction. Each tile includes four occlusions, thus creating subperiodic occlusions in the X and Y direction. Additionally, the occlusions may include glyphs, as illustrated by occlusion M14.

Figure 8:
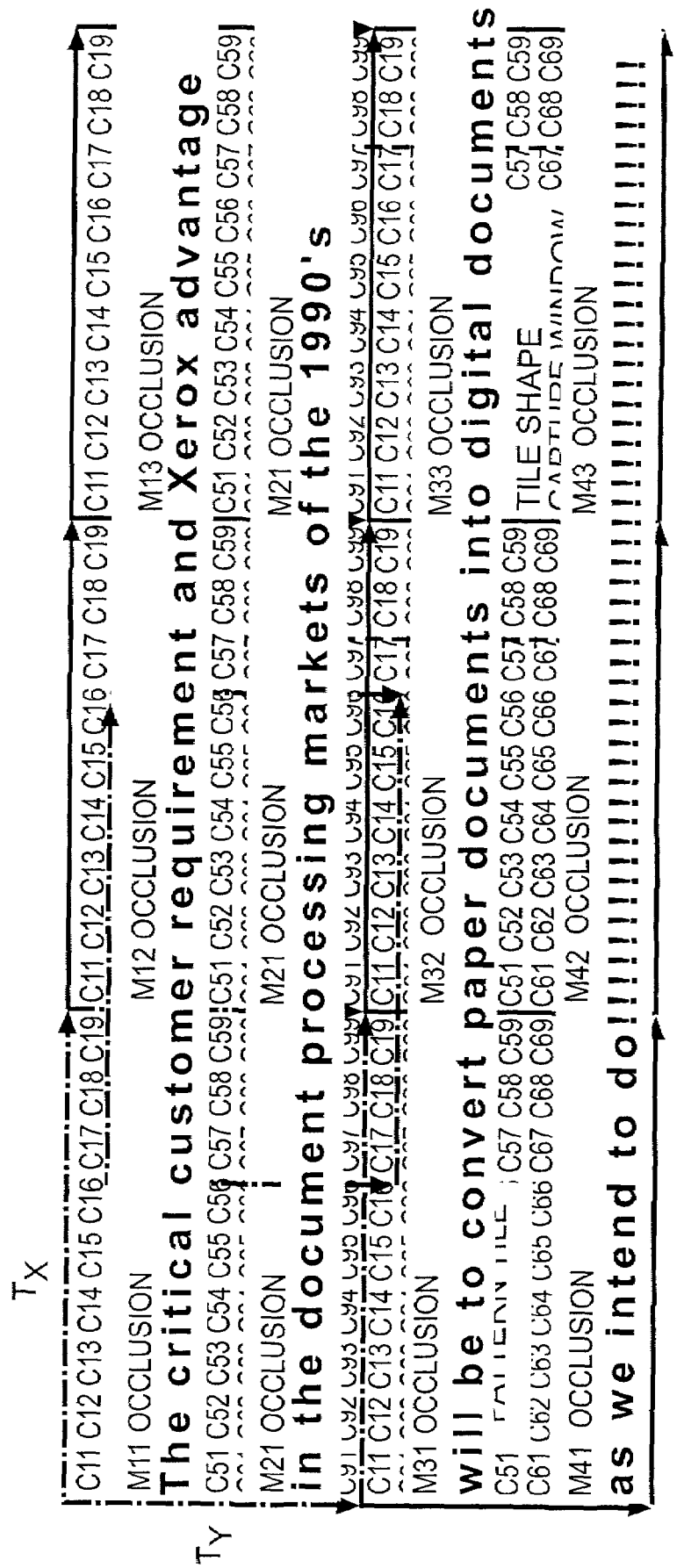
FIG. 8 illustrates subperiodic strip occlusion rectangular glyph tiling and tile capture window as an application to text print GUI.

FIG. 8 illustrates a glyph code pattern having repeating rectangular glyph tiles forming strip occlusions. The strips are formed from contiguous occlusions in the X direction. In the embodiment shown in FIG. 8, text is marked on occlusions in the glyph pattern of repeating tiles.

Figure 9:
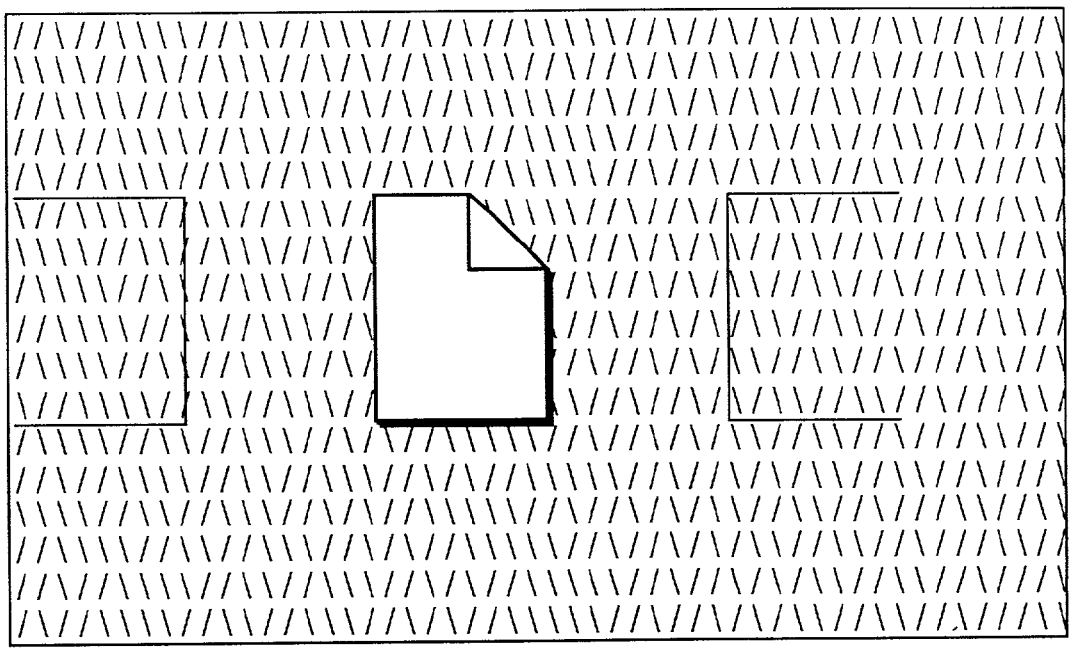
FIG. 9 shows embedded data in the form of an array of rectangular tiles in alternating shades of gray scale to illustrate one embodiment rectangular tile structures.

FIG. 9 shows embedded data in the form of an array of rectangular tiles in alternating shades of gray scale to illustrate one embodiment of rectangular tile structures. The center of each tile as shown in FIG. 9 may have an occlusion. In FIG. 9, the occlusion of the tile at the center is a document icon. The occlusion may also comprise other graphics, text or glyph codes. When glyphs fill in the occluded area, the occlusion glyphs can be visually indistinguishable from the tiled code.

Figure 10:
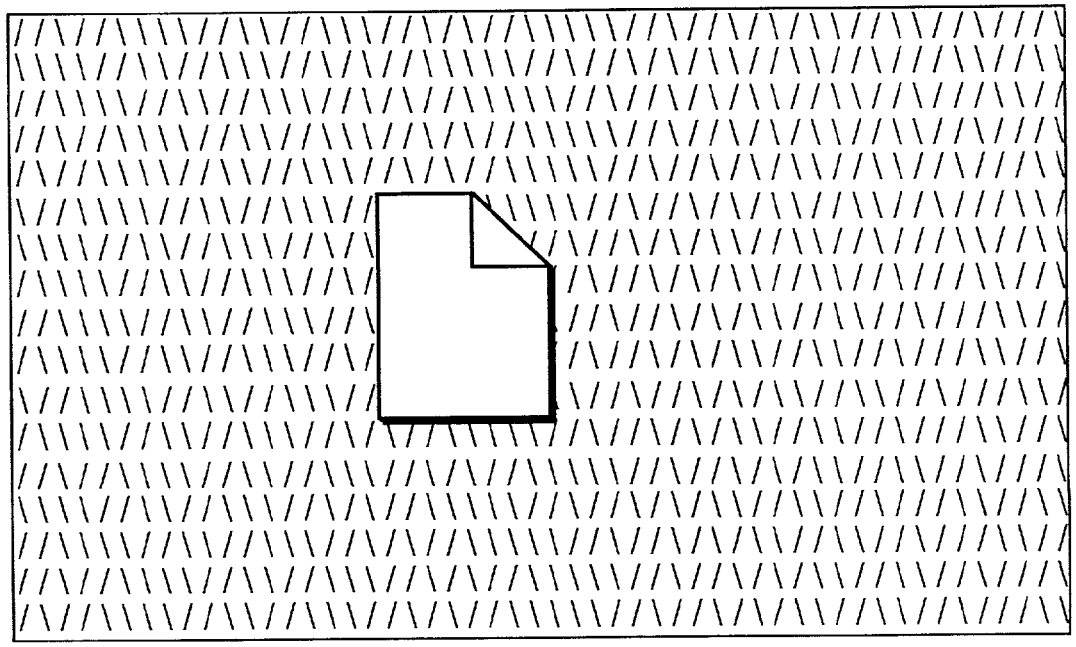
FIG. 10 illustrates the embedded data of FIG. 9 without gray shading.

FIG. 10 illustrates the embedded data of FIG. 9 without gray shading. The occlusions filled in with glyphs are visually indistinguishable from the tile glyphs.

Figure 11:
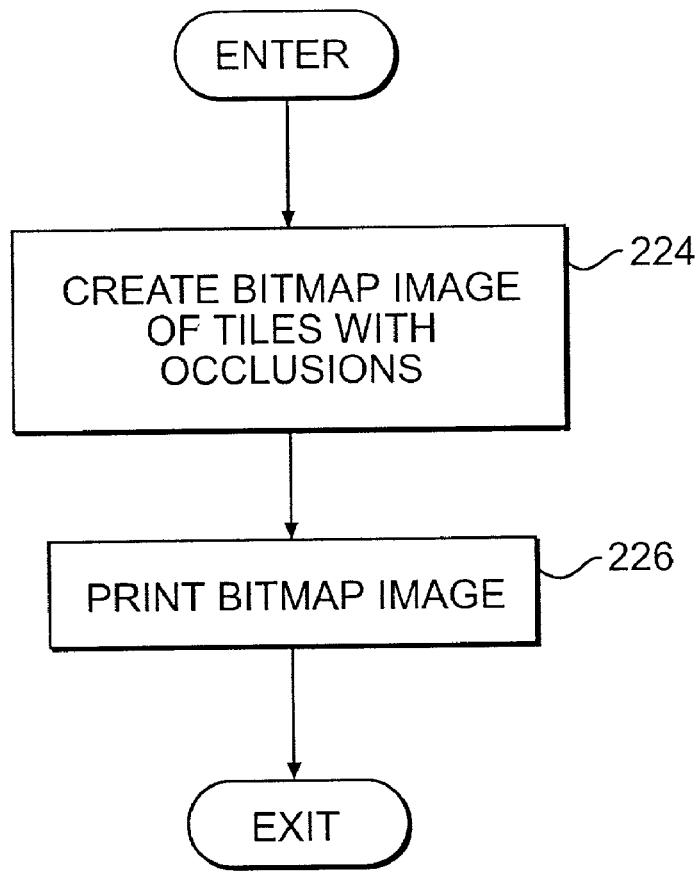
FIG. 11 is a flowchart illustrating writing of a glyph code pattern having repeating rectangular glyph tiles with occlusions.

FIG. 11 is a flowchart illustrating writing of a glyph code pattern having repeating rectangular glyph tiles with occlusions. A bitmap image of tiles with occlusions is created (step 224), and the bitmap image is printed on a substrate (step 226). In another embodiment, the tiles are printed on a substrate and the occlusions are printed over the tiles in a second printing operation. In yet another embodiment, all glyphs are printed together on a substrate and non-glyph occlusion graphics are printed over or under the glyphs in a second printing step. This last embodiment facilitates better alignment of all the glyphs.

Figure 12:
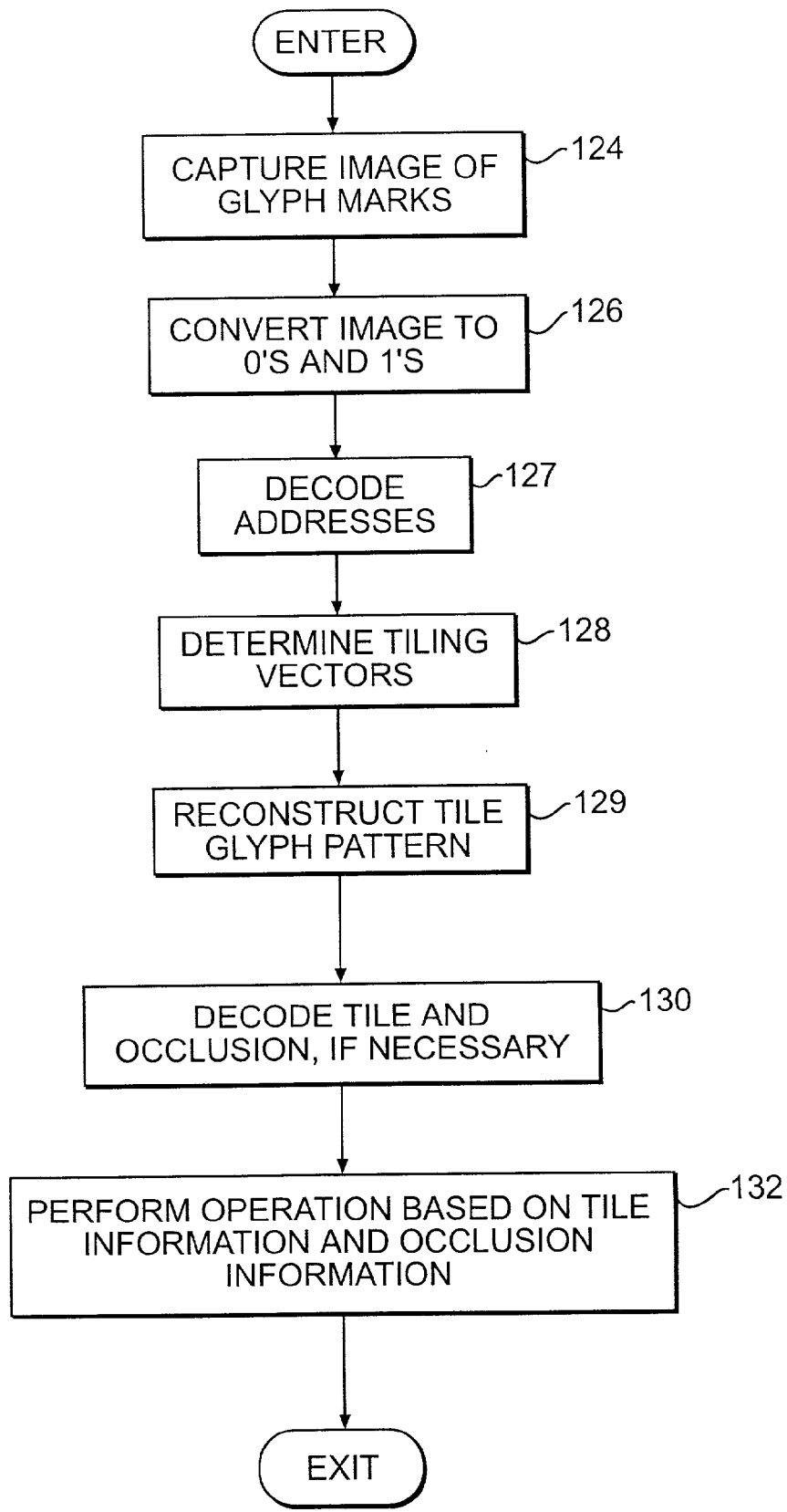
FIG. 12 is a flowchart illustrating reading and decoding of a glyph code pattern having repeating rectangular glyph tiles with occlusions.

FIG. 12 is a flowchart illustrating the process performed by a processor when reading and decoding a glyph code pattern having glyph tiles with occlusions. In one embodiment, the process is performed by a glyph reading device coupled to a processor programmed to perform the steps depicted in the flowchart of FIG. 12. The process could also be performed by special purpose hardware or a combination of hardware and software.

A reading device is used to capture an image of an area of glyph marks from a substrate (step 124). The glyphs in the captured image are converted into a matrix of 0's and 1's (step 126). The matrix is decoded to identify code portions of the tile codes and their logical addresses (step 127). Based on the code portions and their logical addresses, the tiling vectors are determined (step 128), from which the tile is logically reconstructed (step 129). The tile is then decoded, and the occlusion in the tile may be processed. The occlusion is decoded as well if the occlusion includes decodable information, such as glyphs (step 130). Another example of decodable occlusion information is a mark in a check box which may be decoded using existing mark recognition methods. Using the decoded tiled information and the information from the decoded occlusion, if any, processing continues by performing an operation associated with decoded tile information and the decoded occlusion information (step 132).

Figure 13:
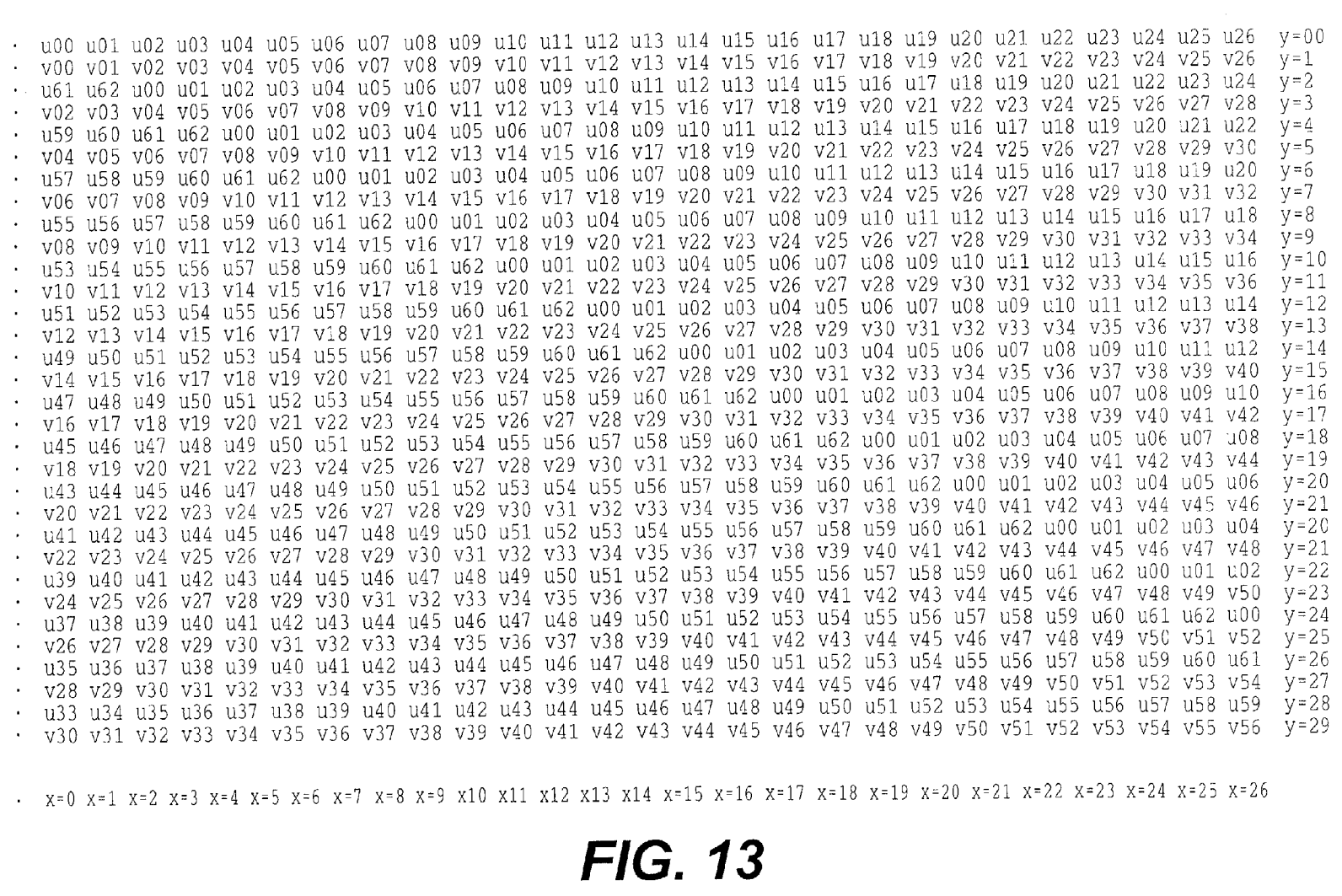

FIG. 13 illustrates an address carpet code. The code is shown and described in U.S. patent application Ser. No. 09/455,304, entitled "Method and Apparatus for Decoding Angular Orientation of Lattice Codes," (now U.S. Pat. No. 6,678,425 that issued on Jan. 13, 2004) which is hereby expressly incorporated by reference. In FIG. 13 the u and v glyph address codes comprise the address carpet. Rows of u address codes are interleaved with rows of v codes. Each row of u address codes is offset by two positions so that a diagonal line running down and to the right at 45° cuts across identical u codes in every other row. Similarly, each row of v address codes is offset by two positions so that a diagonal line running down and to the left at 45° cuts across identical v codes in every other row. This property of the u and v address codes allows determination of the precise location within the code from a captured image of glyphs.

Figure 14:
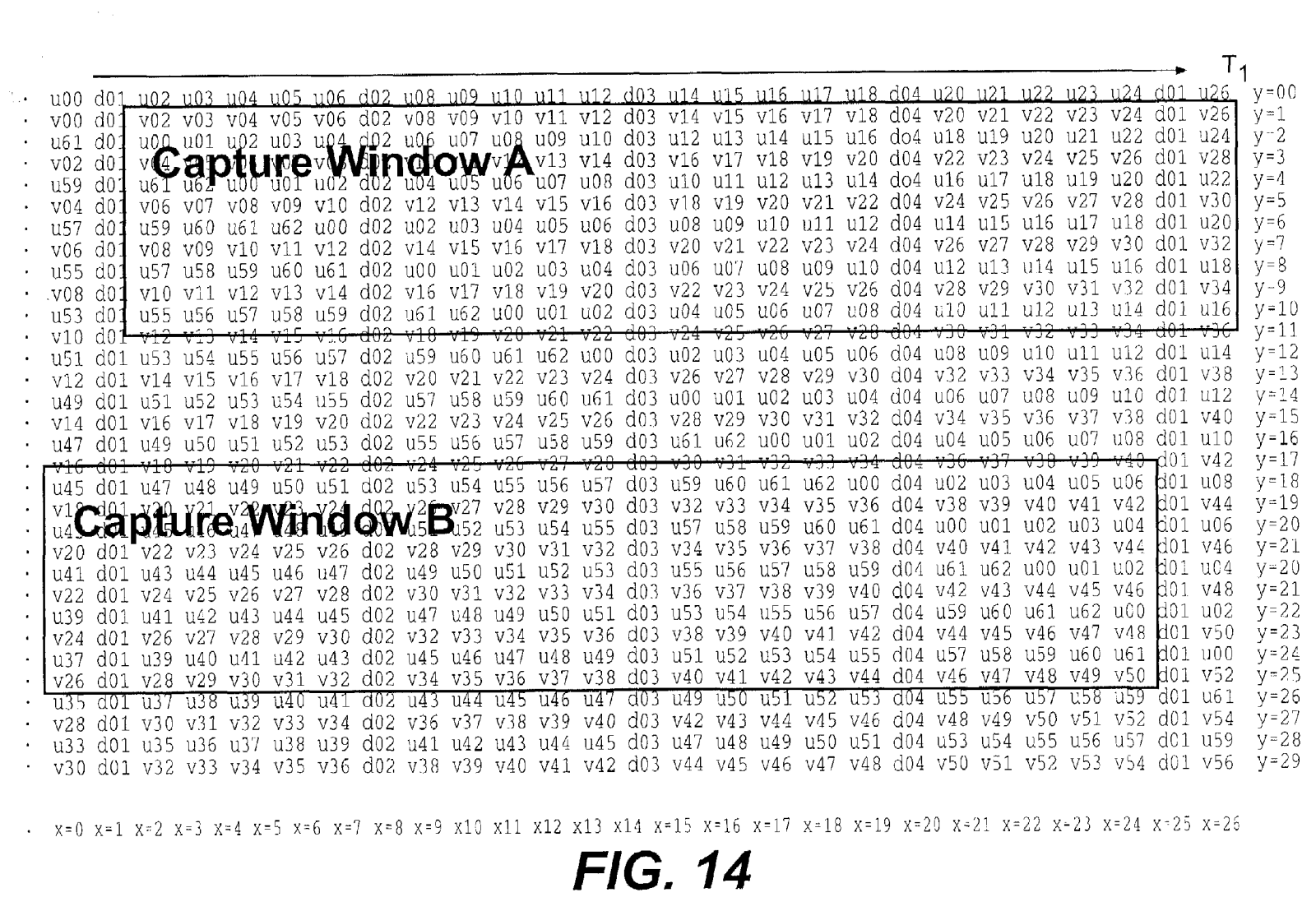

FIG. 14 shows the address carpet code of FIG. 13 with occlusion regions of tiled code in columns of glyphs indicated by d codes. The tiled code period in the X direction includes four columns of d codes spanning tiling vector T1. In a captured portion of the address carpet, the d codes can be decoded to provide a label providing information. The d codes could represent, for example, a page number or context information. The address carpet codes can be used to establish the logical order or address of the tiled code pattern.

Capture window A illustrates a capture area of sufficient extent so as to encompass an area from which the underlying address code and tiled code pattern can be decoded. In the embodiment illustrated in FIG. 14, the area encompasses at least a length T1 in the x tiling direction and a height in the y direction so that confident values of n consecutive bits in each of address codes u, v, and tiled code d can be decoded correctly. The precise location of the capture window may vary. For example, capture window B illustrates a capture area having the same shape and area as capture window A, but shifted in the x and y directions relative to capture window A.

In another embodiment of the coding system of FIG. 14, graphics are included on the substrate with the tiled pattern and address carpet codes. The graphics may be comprised of glyphtones, or may partially obscure the tiled pattern and/or the address carpet codes. Glyphtones are halftone cells having area-modulated glyphs that can be used to create halftone images incorporating a glyph code. The graphic must be of such a character so as not to obscure the tiled pattern or address carpet codes to the point where they cannot be decoded. For example, if the graphic obscured a sufficiently large number of glyphs which define the tiled pattern, the pattern could not be decoded from a captured image.

Figure 15:
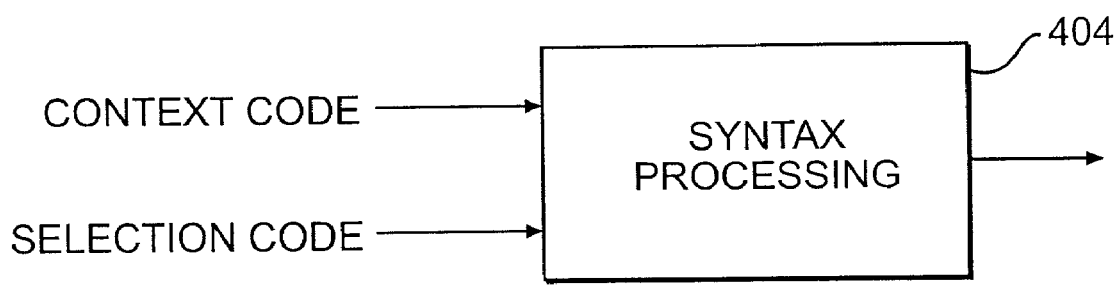
FIG. 15 illustrates an embodiment using a tiled code and an occlusion code as part of a user selection process.

FIG. 15 illustrates an embodiment using a tiled code and a selection code as part of a user selection process. A context code is decoded from the tiled code pattern, and an address pattern located within occlusion regions provides a selection code by spatially locating the selection. Additional selection codes may be provided by angular orientation of the capture and user control signals via buttons etc. The context code and selection code are provided to syntax processing 404. Syntax processing 404 determines whether an action should be taken or whether additional selections need to be made, as is conventional in user selection processing.

This two-level coding system can be used in several ways, such as to implement a graphical user interface. To use this user interface, a user places an image capture device on or near a selection, such as a graphic which may form an occlusion. As an example, the user may place the image capture device in the selection's "hot zone" as described in commonly assigned U.S. application Ser. No. 09/144,250 entitled METHODS AND APPARATUS FOR CAMERA PEN now U.S. Pat. No. 6,310,988 that issued on Oct. 30, 2001, which teaches that a hot zone is an area on or near the visual indicia and is equivalent to selecting the visual indicia. U.S. application Ser. No. 09/144,250 is hereby expressly incorporated by reference. An image is captured which includes an area large enough to allow the tile pattern to be decoded. The image is then decoded to determine the context code from the tile pattern and a selection code associated with the position of selection. This allows tiled codes to be used in a system for capturing an image, decoding the image to determine one or more particular codes from the image, and performing operations based on the one or more particular codes, as described in U.S. patent application Ser. No. 09/223,882, filed Dec. 31, 1998, and entitled MULTI-LEVEL SELECTION METHODS AND APPARATUS USING CONTEXT IDENTIFICATION FOR EMBEDDED DATA GRAPHICAL USER INTERFACES, (now U.S. Pat. No. 6,594,406 that issued Jul. 15, 2003) which is hereby expressly incorporated by reference.

Figure 16:
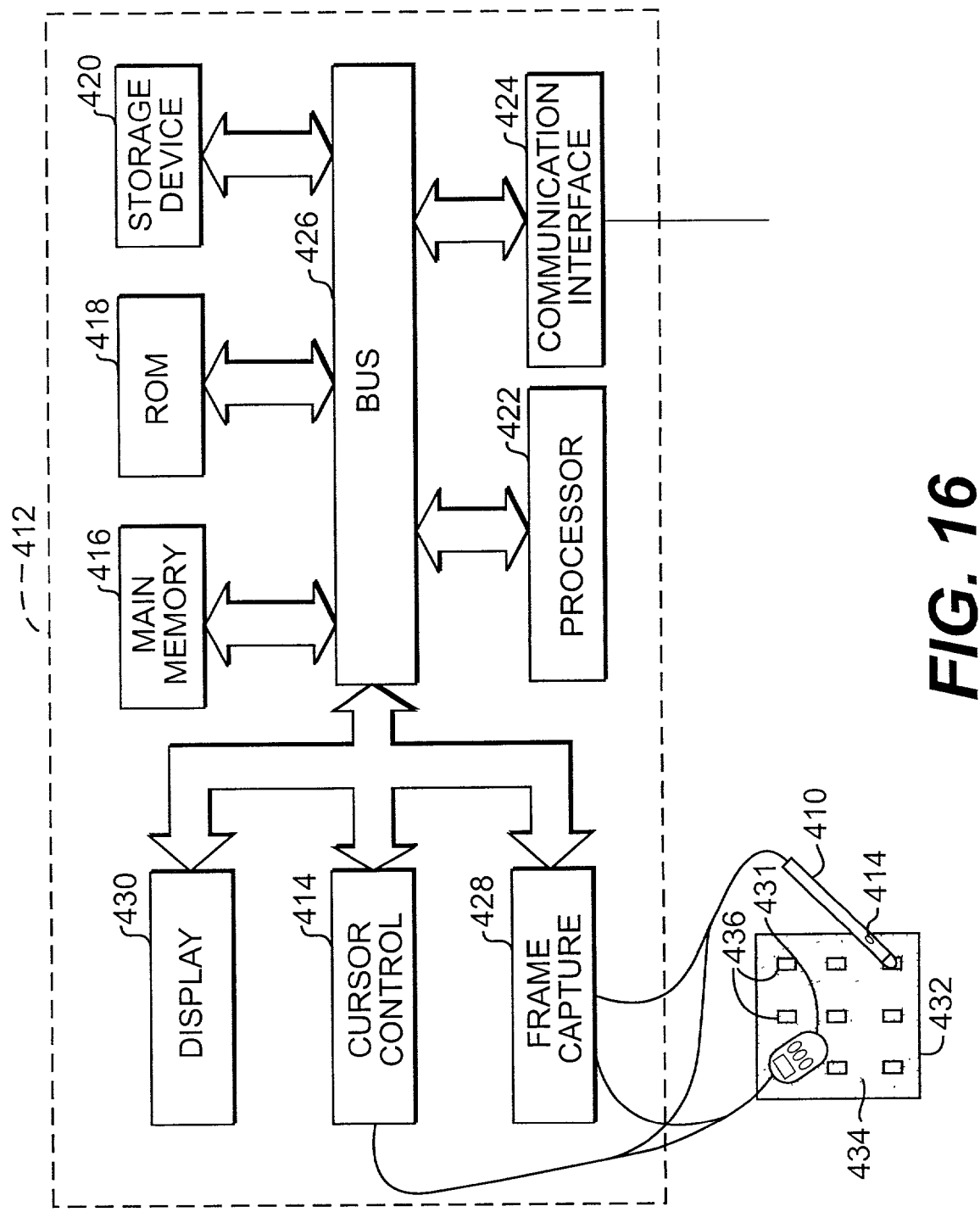
FIG. 16 shows an image capture system that may be used to select an icon and capture a corresponding portion of embedded data.

FIG. 16 is a block diagram of an image capture and processing system consistent with the invention that may be used to: capture a user-selected portion of a substrate 432 comprising glyph marks 434 (shown generally as light gray print) and occlusions 436 (shown generally as dark gray print); decode the embedded data markings in the captured portion; and perform further processing on the decoded information, as described herein. In one embodiment, computer system 412 is a general purpose computer system, such as a conventional personal computer or laptop computer, that includes main memory 416, read only memory (ROM) 418, storage device 420, processor 422, and communication interface 424, all interconnected by bus 426. Bus 426 also connects to display 430, cursor control 414, and frame capture 428.

An image capture device, which in this case is a camera pen 410 or camera mouse 431, is connected to frame capture 428. Either camera pen 410 or camera mouse 431 may be used, but camera pen 410 will be used for purposes of discussion. Camera pen 410 captures an image from substrate 432 and transfers the captured image to frame capture 428. The user makes a selection by placing camera pen 410 on or near visual indicia on glyph marks 432, and pressing one or more buttons on the device. For example, pressing button 414 causes camera pen 410 to capture the portion of the substrate 432 under the tip of camera pen 410, and transmit the image to computer 412, via frame capture 428, for analysis. The depression of one or more buttons can be used for additional signaling, as in a double click, hold down.

As shown in FIG. 16, substrate 432 is comprised of embedded data, such as glyph marks 434 and occlusions 436. Frame capture 428 collects the captured data and separates it into individual frames. These results, together with signals from cursor control 414 are transferred to processor 422 for further processing. In one embodiment, camera pen 410 also transmits button depression signals to frame capture 428 and cursor control 414. The signals cause frame capture 428, cursor control 414, and processor 422 to process the images and button depression signals.

Processor 422 processes the results from cursor control 414 and the captured frame image from frame capture 428 as previously discussed in respect to FIG. 12. In one embodiment, processor 422 computes a context code, a location code, and a rotation code from the data. The context code defines a particular context of substrate 432, such as a substrate page number. The location code defines the location on substrate 432 from location where the captured image was taken. Using the context code location code and rotation code (optionally), processor 422 accesses information related to the context code and location code. For example, if the context code represents substrate page iv, location code indicates location coordinates x=97 and y=92, and rotation=43°, then processor 422 would retrieve information corresponding to that specific location and rotation from substrate 432.

In one embodiment, the retrieved information includes two types of information: a bit map image representation of substrate page iv, and icon information defining the locations and meaning of icons on substrate page iv. In operation, a user selects an icon representing a system object on substrate 432 via an image capture device. In response, a system attached to the computer system of FIG. 16 (not shown) can use the retrieved meaning of the icon to perform functions corresponding to the icon, as a conventional system would in response to user selection of an icon on a graphical user interface in a conventional display. Such a system is shown and described in previously referenced U.S. patent application Ser. No. 09/223,882 entitled "MULTI-LEVEL SELECTION METHODS AND APPARATUS USING CONTEXT IDENTIFICATION FOR EMBEDDED DATA GRAPHICAL USER INTERFACES" (now U.S. Pat. No. 6,594,406 that issued Jul. 15, 2003).

In one embodiment, main memory 416 is a random access memory (RAM) or a dynamic storage device that stores instructions executed by processor 422. Main memory 416 may also store information used in executing instructions. ROM 418 is used for storing static information and instructions used by processor 422. Storage device 420, such as a magnetic or optical disk, also stores instructions and data used in the operation of computer system 412.

Display 430 may be a CRT or other type of display device. Cursor control 414 controls cursor movement on display 430. Cursor control 414 may accept signals from any type of input device such as a trackball, or cursor direction keys.

The system shown in FIG. 16 can be used to capture and decode the occluded embedded data described herein. The system may also implement the two-level syntax processing discussed with respect to FIG. 15. The apparatus and methods described herein may be implemented by computer system 412 using hardware, software, or a combination of hardware and software. For example, the apparatus and methods described herein may be implemented as a program in any one or more of main memory 416, ROM 418, or storage device 420. In one embodiment, processor 422 executes programs which analyze captured portions of occluded embedded data to determine address information encoded in the embedded data.

Such programs may be read into main memory 416 from another computer readable medium, such as storage device 420. Execution of sequences of instructions contained in main memory 416 causes processor 422 to perform the process steps shown, for example, in FIG. 12 or 15.

Various forms of computer readable media may be involved in carrying one or more sequences of instructions to processor 422 for execution. For example, the instructions may initially be carried on a magnetic disk or a remote computer. The remote computer can load the instructions into its dynamic memory and send the instructions over a telephone line using a modem. A modem local to computer system 412 can receive the data on the telephone line and use an infrared transmitter to convert the data to an infrared signal. An infrared detector coupled to appropriate circuitry can receive the data carried in the infrared signal and place the data on bus 426. Bus 426 carries the data to main memory 416, from which processor 422 retrieves and executes the instructions. The instructions received by main memory 416 may optionally be stored on storage device 420 either before or after execution by processor 422.

Computer system 412 also includes a communication interface 424 coupled to bus 426. Communication interface 424 provides two way communications to other systems. For example, communication interface 424 may be an integrated services digital network (ISDN) card or a modem to provide a data communication connection to a corresponding type of telephone line. Communication may also be, for example, a local area network (LAN) card to provide communication to a LAN. Communication interface 424 may also be a wireless card for implementing wireless communication between computer system 412 and wireless systems. In any such implementation, communication interface 424 sends and receives electrical, electromagnetic or optical signals that carry data streams representing various types of information.

The link between communication interface 424 and external devices and systems typically provides data communication through one or more networks or other devices. For example, the link may provide a connection to a local network (not shown) to a host computer or to data equipment operated by an Internet Service Provider (ISP). An ISP provides data communication services through the world wide packet data communications network now commonly referred to as the Internet. Local networks and the Internet both use electrical, electromagnetic or optical signals that carry digital data streams. The signals through the various networks and the signals between the networks and communication interface 424, which carry the digital data to and from computer system 412, are exemplary forms of carrier waves transporting the information.

Computer system 412 can send messages and receive data, including program code, through the network(s) via the link between communication interface 424 and the external systems and devices. In the Internet, for example, a server might transmit a requested code for an application program through the Internet, an ISP, a local network, and communication interface 424.

Program code received over the network may be executed by processor 422 as it is received, and/or stored in memory, such as in storage device 420, for later execution. In this manner, computer system 412 may obtain application code in the form of a carrier wave.

The term "computer-readable medium" as used herein refers to any medium that participates in providing instructions to processor 422 for execution. Such a medium may take many forms, including but not limited to, non-volatile memory media, volatile memory media, and transmission media. Non-volatile memory media includes, for example, optical or magnetic disks, such as storage device 420. Volatile memory media includes RAM, such as main memory 416. Transmission media includes coaxial cables, copper wire and fiber optics, including the wires that comprise bus 426. Transmission media can also take the form of acoustic or light waves, such as those generated during radio wave and infrared data communications.

Common forms of computer-readable media include, for example, a floppy disk, a flexible disk, hard disk, magnetic tape, or any other magnetic storage medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read and use.

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. An embedded data code on a substrate, comprising:
    periodic tiles, each tile comprising
    a predefined code area having a code pattern common to the other tiles; and
    a predefined occlusion area not necessary for decoding the code pattern, the predefined occlusion area having the same location and shape in the periodic tiles; and wherein the occlusion comprises a graphic, wherein the substrate can be captured in an image, and the image analyzed to extract information from the data code embedded in the substrate.

2. The embedded data code of claim 1, wherein each tile comprises glyphs.

3. The embedded data code of claim 1, wherein the occlusion comprises a second code pattern.

4. An embedded data code on a substrate, comprising:
    periodic tiles, each tile comprising
    a predefined code area having a code pattern common to the other tiles; and
    a predefined occlusion area not necessary for decoding the code pattern, the predefined occlusion area having the same location and shape in the periodic tiles, and wherein the occlusion comprises text, wherein the substrate can be captured in an image, and the image analyzed to extract information from the data code embedded in the substrate.

5. The embedded data code of claim 4, wherein each tile comprises glyphs.

6. The embedded data code of claim 4, wherein the occlusion comprises a second code pattern.

7. An embedded data code on a substrate, comprising:

periodic tiles, each tile comprising a predefined code area having a code pattern common to the other tiles;

a predefined occlusion area not necessary for decoding the code pattern, the predefined occlusion area having the same location and shape in the periodic tiles; and comprising multiple distinct occlusions within a tile, wherein the substrate can be captured in an image, and the image analyzed to extract information from the data code embedded in the substrate.

8. The embedded data code of claim 7, wherein each tile comprises glyphs.

9. The embedded data code of claim 7, wherein the occlusion comprises a second code pattern.

10. An embedded data code on a substrate, comprising:

periodic tiles, each tile comprising, a predefined code area having a code pattern common to the other tiles;

a predefined occlusion area not necessary for decoding the code pattern, the predefined occlusion area having the same location and shape in the periodic tiles and comprising occlusions which are contiguous for occlusion strips spanning across tile boundaries, and wherein the occlusion strips contain printing across tile boundaries, wherein the substrate can be captured in an image, and the image analyzed to extract information from the data code embedded in the substrate.

11. The embedded data code of claim 10, wherein each tile comprises glyphs.

12. The embedded data code of claim 10, wherein the occlusion comprises a second code pattern.

* * * * *